(12) United States Patent
Lockwood et al.

(10) Patent No.: US 7,449,432 B2
(45) Date of Patent: Nov. 11, 2008

(54) GEAR OIL COMPOSITION CONTAINING NANOMATERIAL

(75) Inventors: Frances E. Lockwood, Georgetown, KY (US); Zhiqiang Zhang, Lexington, KY (US); Gefei Wu, Lexington, KY (US); Thomas R. Smith, Lexington, KY (US)

(73) Assignee: Ashland Licensing and Intellectual Property, LLC (ALIP), Lexington, KY (US)

( * ) Notice: Subject to any disclaimer, the term of this patent is extended or adjusted under 35 U.S.C. 154(b) by 0 days.

(21) Appl. No.: 11/370,118

(22) Filed: Mar. 7, 2006

(65) Prior Publication Data

US 2008/0242566 A1   Oct. 2, 2008

(51) Int. Cl.
*C10M 169/04* (2006.01)
*C10M 125/02* (2006.01)

(52) U.S. Cl. .................... 508/113; 977/742; 977/745
(58) Field of Classification Search ............... 508/113; 977/742, 745
See application file for complete search history.

(56) References Cited

U.S. PATENT DOCUMENTS

| | | | |
|---|---|---|---|
| 4,915,856 A | 4/1990 | Jamison | |
| 4,927,549 A * | 5/1990 | Harsanyi et al. | 508/172 |
| 5,554,307 A | 9/1996 | Dagorn et al. | |
| 5,614,477 A | 3/1997 | Kompan et al. | |
| 5,652,201 A * | 7/1997 | Papay et al. | 508/228 |
| 5,691,282 A | 11/1997 | Periard et al. | |
| 5,908,585 A | 6/1999 | Shibuta | |
| 6,099,965 A * | 8/2000 | Tennent et al. | 428/408 |
| 6,169,059 B1 | 1/2001 | Skiles et al. | |
| 6,231,980 B1 | 5/2001 | Cohen et al. | |
| 6,419,717 B2 * | 7/2002 | Moy et al. | 44/457 |
| 6,432,320 B1 * | 8/2002 | Bonsignore et al. | 252/70 |
| 6,589,918 B2 | 7/2003 | Denpo et al. | |
| 6,806,238 B1 | 10/2004 | Lorentz et al. | |
| 6,828,282 B2 | 12/2004 | Moy et al. | |
| 2001/0001096 A1 | 5/2001 | Skiles et al. | |
| 2001/0023021 A1 | 9/2001 | Cohen et al. | |
| 2001/0041663 A1 | 11/2001 | Moy et al. | |
| 2002/0100578 A1 | 8/2002 | Withers et al. | |

(Continued)

FOREIGN PATENT DOCUMENTS

JP    11-12586    1/1999

(Continued)

OTHER PUBLICATIONS

Marquis, F.D.S. and Chibante, L.P.F., JOM, Dec. 2005, p. 32.*

*Primary Examiner*—Glenn Caldarola
*Assistant Examiner*—Jim Goloboy
(74) *Attorney, Agent, or Firm*—Carrithers Law Office, PLLC; David W. Carrithers

(57) ABSTRACT

The present invention relates to a novel use of nanomaterials as a viscosity modifier and thermal conductivity improver for gear oil and other lubricating oil compositions. The gear oils of the instant invention have a higher viscosity index, higher shear stability, and improved thermal conductivity compared to currently available gear oils. The preferred nanoparticles also impart a reduction in the coefficient of friction, including reduced friction in the boundary lubrication regime. These properties are obtained by replacing part or all of the polymer thickener or viscosity index improver or some other part of the composition normally used in gear oils with nanomaterials of suitable shape, size, and composition.

41 Claims, 6 Drawing Sheets

U.S. PATENT DOCUMENTS

| | | |
|---|---|---|
| 2003/0108477 A1 | 6/2003 | Keller et al. |
| 2004/0009114 A1 | 1/2004 | Margrave et al. |
| 2004/0109652 A1 | 6/2004 | Risch et al. |
| 2004/0209782 A1 | 10/2004 | Zhang et al. |

FOREIGN PATENT DOCUMENTS

| | | |
|---|---|---|
| JP | 2002-105314 | 4/2002 |
| JP | 2002-265968 | 9/2002 |
| JP | 2002-332490 | 11/2002 |
| JP | 2003-313571 | 11/2003 |
| JP | 2004-35737 | 2/2004 |
| JP | 2004-132507 | 4/2004 |
| WO | PCT WO 91/04311 | 4/1991 |

* cited by examiner

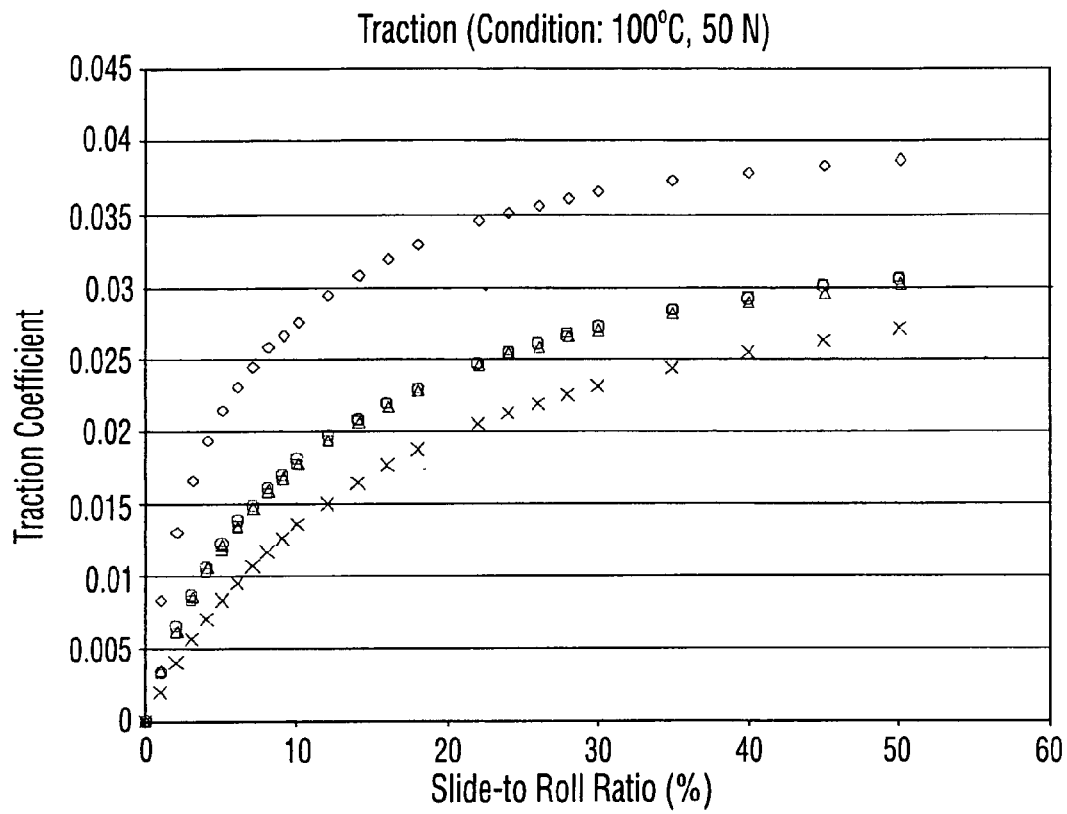

LEGEND:

□: Gear oil based on the instant invention using graphite nanoplates as the nanomaterial (NF-1).

O: Gear oil based on the instant invention using $Al_2O_3$ nanoparticles as the nanomaterial (NF-2).

Δ: Base fluid of the above two nanofluids (no nanomaterials) (BF-1).

×: Base fluid of the above two nanofluids with no polymeric viscosity modifiers at all (BF-2).

◊: Conventional synthetic gear oil 75W-90 (GO).

FIG. 6

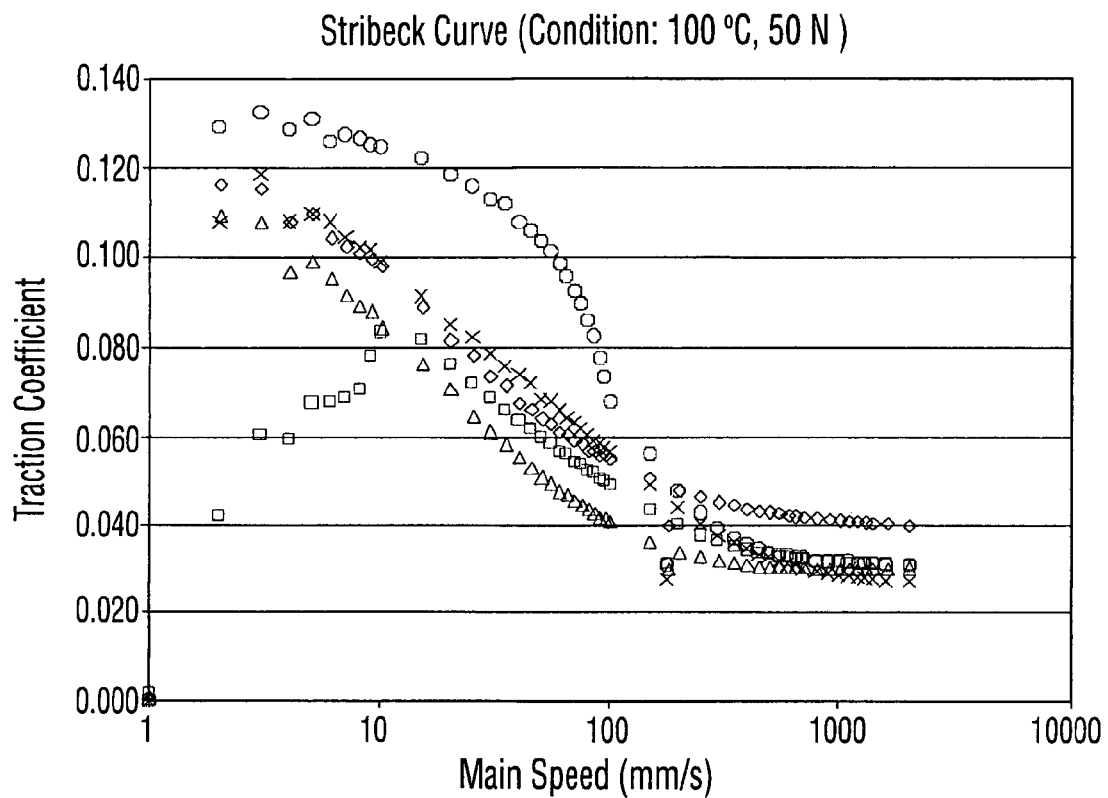

LEGEND:

□: Gear oil based on the instant invention using graphite nanoplates as the nanomaterial (NF-1).

O: Gear oil based on the instant invention using $Al_2O_3$ nanoparticles as the nanomaterial (NF-2).

Δ: Base fluid of the above two nanofluids (no nanomaterials) (BF-1).

×: Base fluid of the above two nanofluids with no polymeric viscosity modifiers at all (BF-2).

◊: Conventional synthetic gear oil 75W-90 (GO).

FIG. 7

GEAR OIL COMPOSITION CONTAINING NANOMATERIAL

CROSS REFERENCE TO RELATED APPLICATIONS

This application claims priority from PCT/US2005/043448 filed on Dec. 1, 2005 claiming priority form Provisional Application Ser. No. 60/644,042 filed on Jan. 14, 2005 and application Ser. No. 11/194,507 filed on Aug. 1, 2005 claiming priority from provisional application Ser. No. 60/592,570 filed on Jul. 31, 2004 and application Ser. No. 10/737,731 filed on Dec. 16, 2003 claiming priority from provisional application Ser. No. 60/433,798 filed on Dec. 16, 2002 and application Ser. No. 10/929,636 filed on Aug. 30, 2004 which is a continuation of U.S. Pat. No. 6,783,746 issued on Aug. 31, 2004 from application Ser. No. 10/021,767 filed on Dec. 12, 2001 claiming priority from provisional application Ser. No. 60/254,959 filed on Dec. 12, 2000 all of which are incorporated herein in their entirety.

BACKGROUND OF THE INVENTION

Field of the Invention

The present invention relates to a novel use of nanomaterials as a viscosity modifier and thermal conductivity improver for gear oil and other lubricating oil compositions. The gear oils of the instant invention have a higher viscosity index, higher shear stability, and improved thermal conductivity compared to currently available gear oils. The preferred nanoparticles also impart a reduction in the coefficient of friction, including reduced friction in the boundary lubrication regime. These properties are obtained by replacing part or all of the polymer thickener or viscosity index improver or some other part of the composition normally used in gear oils with nanomaterials of suitable shape, size, and composition.

Gear oils have specific requirements to provide protective elastohydrodynamic and boundary films over a broad temperature and torque range in equipment such as rear axles and industrial gear boxes to name a few examples. More recently there has been a focus on providing gear oils that also contribute to fuel efficiency by providing reduced traction and improved boundary lubrication. Heat dissipation has also become increasingly important due to the trend to independent rear axles in automotive truck applications, and the overall trend to decrease component weights. Because of the relatively large particle size and particle settling of the conventional graphite dispersions, the use of graphite in gear oils for automotive systems is not practiced to any known extent. These larger graphite particles have been used conventionally in greases, which are used in some industrial gearing systems. However, examination of typically available graphite dispersions, showed that they contributed insignificantly to the gear oil viscosity index and thermal conductivity. It is known that gear oils with high viscosity index will favor improved fuel economy and whereas lower gearbox temperatures favor improved durability. The present state of the art is limited to improving viscosity index by preferential selection of base oils or use of polymeric viscosity index improvers. Gearbox temperatures have been lowered by selection of known friction modifiers such as particulate molybdenum disulfide, borate-containing additives as described by Gangopadhyay et. al. in SAE Paper 2002-01-2821.

The viscosity of petroleum products generally varies greatly with temperature, and for lubricating oils for automobiles, the temperature dependence of the viscosity is desired to be small. Therefore, a polymer has been widely used as a viscosity modifier having an effect of improving viscosity index for the purpose of decreasing the temperature dependence of the lubricating oils.

Viscosity index of a fluid is defined as the relationship of the viscosity of that fluid to the temperature. It is determined by measuring the kinematic viscosities of the oil at 40 and 100° C. and then calculated by using the tables or formulas included in ASTM D 2270. High viscosity index fluids (e.g., synthetic base oils or mixtures of base oil and viscosity modifiers) display less change in viscosity with temperature than low viscosity index fluids.

Mineral oils, which are very effective lubricants at low temperatures, become less effective lubricants at high temperatures. At high temperatures, their film-forming ability (in the hydrodynamic lubrication regime) diminishes because of a drop in viscosity. Prior to the use of viscosity modifiers and the introduction of multigrade oils, this problem was partly overcome through seasonal oil changes.

The principal function of a viscosity modifier is to minimize viscosity variations with temperature. Viscosity modifiers are typically added to a low-viscosity oil to improve its high-temperature lubricating characteristics. Viscosity modifiers are principally organic polymers that function to increasingly inhibit the free flow of fluid within a mixture of fluids and viscosity modifiers as the temperature of the mixture increases. This represents a practical means by which the operating range of mineral oils is extended to high temperature without adversely affecting too much their low-temperature fluidity.

At low temperature, the polymer molecules occupy a small (hydrodynamic) volume and therefore have minimal association with the base oil. The effect should be little viscosity increase. The situation is reversed at high temperature because these polymer chains extend or expand as a consequence of added thermal energy. This increases the association of the polymer with the base oil because of an increase in the exposed polymer surface area. The result is an effective increase in viscosity at this high temperature. FIG. 1 illustrates the uncoiling of a polymer due to an increase in temperature resulting in oil thickening by said polymer due to increased resistance to the free flow of fluid within the mixture.

Olefin copolymers (OCP), polymethacrylates (PMA), hydrogenated styrene-diene (STD), and styrene-polyester (STPE) polymers are common types of viscosity modifiers used in modern lubricant formulations.

In these base oil and viscosity modifier mixtures, there is always some undesired viscosity increase at low temperatures (i.e. below −20° C.) caused by these viscosity modifiers as they function as thickeners without substantially improving viscosity index at low temperatures. Moreover, these polymers can contribute to the formation of macromolecular wax structures.

When the surrounding temperature lowers, a wax component in the base oil is crystallized and tends to coagulate, which inhibits free flow within the mixture. A pour point depressant (PPD) is usually added to the lubricating oil to hinder the coagulation of these wax components and interrupt the formation of a three-dimensional network attributed to crystallization of the wax component in the lubricating oil thus depressing the pour point of the lubricating oil. The viscosity of a lubricant at a high shear rate is determined by the degree of compatibility of a base oil with the viscosity modifier. The viscosity at a low shear rate is most affected by the compatibility between the pour point depressant and wax components. It is known that when an ethylene/α-olefin copolymer having specific composition is used as a viscosity modifier, the effect of the pour point depressant is markedly reduced because of an interaction between the copolymer and the pour point depressant (e.g., U.S. Pat. No. 3,697,429 and U.S. Pat. No. 3,551,336). Ideally, the viscosity modifier to be blended with a base oil will improve the viscosity index of the base oil while not inhibiting the function of the pour point depressant.

The thickening effect of particles to a fluid base is well known and described in length by P. C. Hiemenz and R. Rajagopalan, Principles of Colloid and Surface Chemistry, 3$^{rd}$ ed., Marcel Dekker, Inc., 1997, Chapter 4. The initial theory was developed by Albert Einstein in 1906, and there have been various modifications and deviations in this theory, the details of which are outside of the scope of the present invention. Nanoparticles have been added to a fluid for the purpose of increasing thermal conductivity (U.S. Pat. No. 6,221,275, U.S. Pat. No. 6,432,320, and U.S. Pat. No. 6,695,974). However, there has been little or no progress in addressing the issue of the viscous thickening effect of these nanoparticles. In most applications, this viscous thickening effect is undesirable and the prior art teaches away from utilizing this effect, since the increased viscosity will demand an increase in required pumping power, more energy loss due to internal fluid friction, and even malfunction or catastrophic failure of the machinery if the viscosity falls outside of the required range.

It has also been recognized, that for gear oils, which must contain an extreme pressure (EP) additive(s) to prevent wear at high loads, there is the potential for thickening attributed to additive breakdown and agglomeration of graphite (U.S. Pat. No. 4,417,991). The graphite used in the '991 patent was larger than is used in the present invention.

In the present invention, with very careful formulation, the viscous thickening effect of the nanoparticles has become a desired attribute, using the nanoparticles as a novel viscosity modifier. Since nanoparticles are usually not polymer based, they do not cause compatibility issues with other polymeric additives/components in a lubricating fluid, and they do not contribute to wax formation by themselves. Furthermore, the agglomeration effect referred to in U.S. Pat. No. 4,417,991 was avoided by formulating with selected dispersants and EP additives and by milling the particles using the method of the present invention.

Another purpose of a lubricant, including gear oil, is to function as a coolant, particularly under high torque conditions. Traditionally, water is most preferred for heat removal, however, in order to function as a lubricant, gear oils are made primarily from hydrocarbons, which have much lower thermal conductivity and heat capacity than water. Typical gear lubricant base oils include mineral oil, polyalphaolefin, ester synthetic oil, ethylene oxide/propylene oxide synthetic oil, polyalkylene glycol synthetic oil, etc. The thermal conductivity of these oils is typically 0.12 to 0.16 W/m·K at room temperature, most typically 0.12 to 0.14 W/m·K, compared to water at 0.61 W/m·K, as set forth in Table 1. Typically these lubricants have many other important functions, and they are carefully formulated to perform to exacting specifications, including friction and wear performance, low temperature performance, fuel efficiency performance, etc. Often designers would desire a fluid with a more consistent viscosity over a wide range of temperatures (usually quantified by the term "viscosity index"), better boundary lubrication, and higher thermal conductivity than traditional oils, but are restricted due to the many other parameters the lubricant must meet.

TABLE 1

| Thermal conductivity of various materials (at room temperature) | |
|---|---|
| Material | Thermal Conductivity (W/m · K) |
| Mineral oil | 0.13 |
| Fully-formulated lubricant | 0.12-0.16 |
| Ethylene glycol | 0.253 |
| Water | 0.613 |
| Commercial antifreeze | 0.40 |
| Graphite | 80-700 |

The use of graphite in fluids such as lubricants is well known by those skilled in the art. Graphite has been added as a friction reducing agent (or friction modifier) and also functions to improve the load carrying capacity of the lubricant therefore reducing surface damage to working parts. In order to act as a friction modifier, it is well known that the graphite layered structure must contain some small amount of water or other suitable material to create the interlayer spacing and thereby lamellar structure. There are various commercially available graphite suspensions, e.g., from Acheson Colloid Co., which are specifically intended for use in lubricants. The size of the particles is varied for different dispersions, but the minimum size for commercially available products is in the submicron range, typically interpreted by those skilled in the art as 500-800 nm (nanometers). The viscosity modification advantage of the graphite is not mentioned in the sales literature, nor is the product sold or promoted for its viscosity modification property. Likewise, the thermal advantage of the graphite is not mentioned in the sales literature, nor is the product sold or promoted for its thermal conductivity property.

While there have been various patents filed on lubricants containing graphite (e.g. U.S. Pat. No. 6,169,059 and U.S. Pat. No. 4,417,991) there are none which describe the use of graphite to improve the thermal conductivity of a lubricant formulated for specific applications. Furthermore, there are no indications that the use of nanometer-sized graphite, with mean particle size significantly less than 1000 nm, has been described in the art and shown to control thermal conductivity by controlling particle size. While graphite-containing automotive engine oils were once commercialized (ARCO GRAPH-ITE™), the potential to use graphite as a heat transfer improving material or viscosity modifier in this oil was not realized by those skilled in the art. A larger particle size of graphite was used in these earlier lubricants (mean greater than one micron) than for the present invention. As a result, the graphite had some settling tendency in the fluid. Graphite of this size also significantly affects the friction and wear properties of the fluid, and heretofore has been used to reduce friction and improve wear performance of the fluid, e.g. in metalworking fluids. On the other hand, the use of graphite in lubricants for recirculating systems was made unpopular, partly due to evidence that micron size graphite could "pile up" in restricted flow areas in concentrated contacts, thereby leading to lubricant starvation. No recognition of the effect of graphite particle size on the phenomena was disclosed. Furthermore, the invention of the graphite nanoplate described herein, was previously unknown.

Previously, naturally formed "nano-graphites" have not been available in the marketplace at all. Recently, Hyperion Catalysis International, Inc. commercialized carbon nanotubes or so-called carbon fibrils, which have a graphitic content and are described in U.S. Pat. No. 5,165,909. Carbon nanotubes are typically hollow graphite-like tubules having a diameter of generally several nanometers to several tens nanometers. They exist in the form either as discrete fibers or aggregate particles of nanofibers. The thermal conductivity of the Hyperion Catalysis International, Inc. material is not stated in their product literature. However, the potential of carbon nanotubes to convey thermal conductivity in a material is mentioned in the '909 patent. Actual measurement of the thermal conductivity of the carbon fibrils they produced was not given in the patent, so the inference of thermal conductivity is general and somewhat speculative, based on graphitic structure. Some recent publications calculate by theoretical methods that the thermal conductivity of single wall carbon nanotubes may exceed 2000 W/m·K.

U.S. Pat. No. 6,432,320 teaches that nano-powders such at copper, iron, alloys, etc., and carbon, can be combined with heat transfer liquids and a coating on the powder to form a colloidal dispersion with enhanced heat transfer properties. The shape of the particles, which has been found to be important for the instant invention, was not defined or described. Particles referred to such as diamond, fullerenes, and carbon nanotubes are not useful to the instant invention unless the shape and aspect ratios can be defined and controlled as stated in the instant invention. We provide numerous instances of these particles either not providing significant heat transfer benefit or being completely unacceptable for gear oils due to performance in viscosity or boundary lubrication control.

Similarly, U.S. Pat. No. 6,695,974 claims the use of nano-materials with $sp^2$ type and $sp^3$ type bonding in heat transfer fluid, including nanotubes, diamond and fullerenes and may have a coupling agent bonded thereto or enclosed therein when the nanotube or fullerene forms a hollow capsule. Although the cross sectional size of the nanotubes is specified as about 100 nm and preferably of about 25 nm, the aspect ratio is not specified. It is shown in the instant invention that the aspect ratio is a critical parameter for the use of nanotubes in gear oils due to the requirement to control viscosity in shear fields. Since the shape of the fullerene example cited in U.S. Pat. No. 6,695,974 was not given, we can not comment on its suitability for use in gear oils except to state that the small increase in heat transfer estimated from the rough experiment cited, is comparable to what we have observed for spheroidal fullerenes and therefore are not preferred for use in gear oils. Available product literature on fullerenes also indicates that they are not of high thermal conductivity.

Utilization of graphitic nanomaterials for the present purpose have not been released in lubrication formulations before and a point of novelty in the instant invention is the ability to reduce relatively inexpensive bulk graphite to produce a carbon nanomaterial, referred to as "carbon nanoplates", having a particle size suitable for long-term stable dispersion in lubricating compositions and the method of dispersing same.

While the present invention is applicable in gear oils, automatic transmission fluids (ATF), power transmission fluids and hydraulic steering fluids, the examples and further discussion will focus on gear oils; however, the claims are applicable to the power transmission fluids, hydraulic steering fluids, and other types of oil based non-compressible fluids as well.

SUMMARY OF THE INVENTION

In this invention, nanoparticles, especially carbon nanomaterials with graphitic structure, such as carbon nanotubes or fibrils (e.g., U.S. Pat. No. 5,165,909), and other nanoparticles of carbon with graphitic structure, are used to improve the viscosity index, shear stability, thermal properties and friction properties of gear oil. In its simplest form, the nanoparticles are dispersed into a base fluid to obtain fluid viscosity capable of supporting loads typical of gear systems. In a preferred form a dispersing agent or surfactant is used for the purpose of stabilizing the nanomaterial. In the most preferred form the chemically and physically dispersed nanoparticles in base oil are combined with other additives effective in gear oil formulations, e.g. viscosity modifiers, detergents, dispersants, antioxidants, extreme pressure and antiwear additives, demulsifiers, defoamers, and corrosion inhibitors.

One preferred nanomaterial is a high thermal conductivity graphite, exceeding 80 W/m·K in thermal conductivity. Bulk graphite, or larger particle graphite is ground, milled, or naturally prepared by a process to create a new type of nanoparticles—carbon nanoplates, with mean particle size less than 500 nm in diameter, and preferably less than 100 nm, and most preferably less than 50 nm. The carbon nanoplates or other graphitic nanoparticles are dispersed in the fluid by one or more of various methods, including ultrasonication, milling, and chemical dispersion.

In theory, many compositions of nanoparticles could be used to achieve the viscosity index and shear stability improvement, however, many will be excluded due to other unfavorable characteristics. Carbon nanostructures such as nanotubes, nanofibrils, and nanoparticles are another type of graphitic structure useful in the present invention, provided that the shape of the majority of the particles should allow for partial or full alignment in flow fields at high shear rates ($>10^5$ $s^{-1}$), i.e. they should have certain degree of asymmetry, and that the aspect ratio of the particles is small enough to prevent excessive permanent viscosity loss in shear fields. To align in shear fields the particles should be non-spheroidal, however, spheroidal particles can be mixed with aligning particles such as plates or tubes to obtain desired shear behavior. Metal particles such as copper, silver, gold, etc., can be used, but are generally less effective than carbon. Known solid lubricants such as molybdenum disulfide, boric acid, boron nitride, etc. can also be milled to nanosize and used to achieve some viscous thickening, but are minimally effective in increasing thermal conductivity. Abrasive particles such as aluminum oxide and many types of carbides, e.g. silicon carbide may be excluded due to high friction or wear in some scenarios, but do impart some improvement in viscosity index and thermal conductivity.

The present invention provides, at a minimum, a fluid of lubricant containing from 0.001% to 15% by weight nanoparticles, and preferably, from 0.01% to 10% by weight, and more preferably, from 0.1% to 5% by weight of nanoparticles. Preferably, however, a minimum of one or more chemical dispersing agents and/or surfactants, up to 10% by weight are also added to achieve long-term stability. The term "dispersant" in the instant invention refers to a surfactant added to a medium to promote uniform suspension of extremely fine solid particles, often of colloidal size. In the lubricant industry the term "dispersant" is generally accepted to describe the long chain oil soluble or dispersible compounds which function to disperse the "cold sludge" formed in engines. The term "surfactant" in the instant invention refers to any chemical compound that reduces surface tension of a liquid when dissolved into it, or reduces interfacial tension between two liquids or between a liquid and a solid. It is usually, but not exclusively, a long chain molecule comprised of two moieties: a hydrophilic moiety and a lipophilic moiety. The hydrophilic and lipophilic moieties refer to the segment in the molecule with affinity for water, and that with an affinity for oil, respectively. These two terms, dispersant and surfactant are used interchangeably in the instant invention. The particle containing fluid of the instant invention will have a viscosity index higher than the conventional fluid of the same type. The fluid can have any other chemical agents or other type particles added to it as well to impart other desired properties, e.g. friction reducing agents, antiwear or anticorrosion agents, detergents, antioxidants, dispersants, defoamers, viscosity index improvers, pour point depressants, demulsifiers, or thermal property booster. Furthermore, the term fluid in the instant invention is broadly defined to include pastes, gels, greases, and liquid crystalline phases in either organic or aqueous media, emulsions and microemulsions.

As set forth above, a useful nanomaterial could be derived from the majority of commercially available nanoparticles, or any material which can be wet-milled into nanometer-sized particles using the process developed in the instant invention which will be explained in detail later. The preferable nanoparticles are carbon-based materials. A preferred form of carbon nanomaterials are carbon nanoplates. A preferred source of carbon nanomaterials is graphite. The carbon nanomaterials can be prepared from larger graphite particles or bulk graphite. A preferred form of graphite for such preparation is POCO FOAM™ from Poco Graphite. Another preferred form is graphite powders from UCAR Carbon Company Inc. Still another preferred form of graphite is graphite powders from Cytec Carbon Fibers LLC. Still another preferred form of graphite is bulk graphite from The Carbide/Graphite Group, Inc. The bulk materials must be processed by the method of the instant invention to produce nanomaterials. A preferred inorganic nanomaterial is aluminum oxide nanoparticles from Sasol. The nanomaterial containing dispersion may also contain one or more other chemical compounds, such as polymers, antiwear agents, extreme pressure agents, friction reducing agents, anti-corrosion agents, detergents, metal passivating agents, antioxidants, antifoaming agents, corrosion inhibitors, pour point depressants, and additional conventional polymer-based viscosity improvers.

Furthermore, the nanomaterial dispersion can be pre-sheared, in a turbulent flow, such as a nozzle, or a high pressure fuel injector, an ultrasonic device, or a mill in order to achieve a stable viscosity. This may be especially desirable in the case where carbon nanotubes with high aspect ratio are used as the graphite source, since they, even more than spherical particles, will thicken the fluid but lose viscosity when exposed in turbulent flows such as the flow regime in engines. Pre-shearing by milling, sonicating, or passing through a small orifice, such as in a fuel injector, is a particularly effective way to disperse the particles and to bring them to a stable size so that their viscosity modifying effect will not change upon further use in actual applications.

The milling process itself, or other pre-shearing process, can have a rather dramatic effect on the long term dispersion stability. It has been found that a preferred process is to mill the particles to a thick pasty liquid of particles with mean size less than 500 nanometers in diameter. The pasty liquid is then used as concentrate to prepare lubricants of various viscosity grades, and can be easily diluted to make a fluid with suitable viscosity for a desired application as an automotive fluid such as gear oil, engine oil, automatic transmission fluid, shock absorber oil, etc. A very effective paste can be made by mixing particles in a viscous base fluid in a loading of 5% to 20% by weight and milling for a period of several hours. The base fluid preferably contains from 20% up to 80% of the dispersant/surfactant mixture with the remainder being natural, synthetic, or mineral base oil. Once the concentrate prepared by milling is diluted to liquid consistency with base oil and other lubricating fluid components, the entire fluid can optionally be passed through a small orifice device to further increase the uniformity and decrease the size of dispersed particles.

An important aspect of this invention is that the final lubricant should be prepared to give an acceptable lubricant film thickness at the maximum shear rate, load and temperature of use in the target application. The maximum concentration of particles in the final (diluted) lubricating fluid is limited by the relationship between viscosity increase of the fluid caused by the particles, and the temporary loss of viscosity (associated with the particles) at maximum temperature and shear rate of fluid use. In general, the viscosity of the lubricant of the instant invention will be matched with conventional fluid at high operating temperature, typically 100° C., and the 40° C. viscosity of the lubricant of the instant invention will be less than that of the conventional fluid thus the fluid viscometrics of the present invention will be more stable over the same temperature range than the viscometrics of a conventional lubricant. This means that the viscosity index of the particle-containing lubricant of the instant invention will be higher than that of the conventional fluid.

The absolute or improved permanent shear stability and the reduced friction properties of the oil is obtained by replacing part or all of the polymer thickener or viscosity index improver normally used in gear oils with the prescribed nanoparticles. The graphite or other nanomaterials contribute to the overall fluid viscosity, partly or completely eliminating the need for viscosity index improvers and providing a very high viscosity index. Likewise, thermal conductivity enhancement, compared to the fluid without graphite or analogous nanomaterials, is proportional to the amount of nanomaterials added. Particle size and dispersing chemistry are controlled to get the desired combination of viscosity and thermal conductivity increase from the base oil while controlling the amount of temporary viscosity loss in shear fields. The resulting fluids have unique properties due to the improved friction properties (reduced traction coefficients and reduced boundary friction), high thermal conductivity, and high viscosity index obtained from the nature of suspended graphite nanoparticles, as well as their small size.

Preferred Embodiment

Although various materials can be used to produce nanomaterials with some effect in the benefits cited, most of the examples in this invention utilize the preferred nanometer-sized carbon nanomaterials of thermal conductivity higher than 80 W/m·K Stable dispersion is achieved by physical and chemical treatments.

For example, the instant invention provides a method for making a composition for the gear oils that has improved permanent shear stability and viscosity index, improved performance in boundary and elastohydrodynamic (EHD) lubrication and enhanced thermal conductivity, up to 80% greater than their conventional analogues. In the present invention the fluid medium is targeted in its viscosity, friction, and antioxidant characteristics to perform in modern gearing systems, e.g. rear axles.

One preferred composition contains an effective amount of at least one base oil such as mineral oil, hydro-cracked mineral oil with high viscosity index, napthenic oil, vegetable derived oils, polyalphaolefins, poly-internal-olefins, poly-alkylglycols, polycyclopentadienes, propylene oxide or ethylene oxide based synthetics, silicone oils, phosphate esters or other synthetic esters, or any suitable base oil; an effective amount of at least one type of nanomaterial, preferably graphite nanoplates or other graphite nanoparticle or carbon nanotubes of relatively small aspect ratio (length/diameter), and an effective amount of at least one dispersing agents or surfactants for the purpose of stabilizing the nanoparticles.

Nanomaterials

Carbon nanoplates as prepared in the instant invention with a graphitic structure and a roughly disc shape are a preferred type of nanoparticles. A novel method has been developed whereby bulk graphite or larger graphite particles or fibers are milled to form a thick pasty liquid of particles, herein named carbon nanoplates, with mean size less than 500 nanometers in diameter. The pasty liquid is then used as concentrate to prepare lubricants of various viscosity grades, and can be easily diluted to make a suitable lubricant to function as a gear oil when combined with the appropriate base oil and additives.

A very effective paste can be made by mixing particles in a viscous base fluid in a loading of 5% to 20% by weight and milling for a period of several hours. The base fluid preferably contains from 20% up to 80% of the dispersant/surfactant mixture with the remainder being natural, synthetic, or mineral base oils. Once the normally conductive concentrate prepared by milling is diluted to liquid consistency with base oils and other gear oil components, the entire fluid can optionally be passed through a small orifice to further increase the uniformity and decrease the size of dispersed particles. The pastes can be made from larger size commercially available graphite, e.g. POCO FOAM, available from Poco Graphite, Inc., and graphite powders available from UCAR Carbon Company Inc. Poco Foam is a high thermal conductivity foamed graphite, thermal conductivity typically in the range 100 to 150 W/m·K. Still another preferred nanomaterial is the high thermal conductivity bulk graphite, Part# 875G, from the Carbide/Graphite Group, Inc. Either of these types of graphite is prepared for the instant invention by pulverizing to a fine powder, dispersing chemically and physically in a fluid of choice, and then ball milled or otherwise size-reduced until a particle size of less than 500 nm diameter mean size is attained. Graphite nanoparticles this small usually exhibit the morphology as "nanoplate" or "nanodisk" (these two terms, nanoplate and nanodisk, are heretofore used interchangeably in this invention), i.e., plate-like or disk-like particles in the nanometer-size scale, with average diameter much larger than the average thickness of particles.

The preferred method is to disperse the graphite by ball milling in a viscous fluid of certain additives (detergents, dispersants, etc.) and then diluting the obtained concentrate with base oil and other additives as needed to attain the final viscosity and performance characteristics. The finer the particle size attained upon milling, the better the viscosity thickening effect of the pasty concentrate to the final blend. The viscous thickening effect must be carefully balanced to attain a suitable lubricating film thickness at the maximum shear rate and temperature of fluid use. In general, any commercially available graphite material can be used, provided that pulverization, milling and other described chemical and physical methods can be used to reduce the size of the final graphite dispersion to below a mean particle size of 500 nm in diameter. FIG. 2 shows an atomic force microscopic picture of the graphite nanoplates in a fluid processed by the wet-milling method.

Another preferred nanomaterial is aluminum oxide nanoparticles from Sasol North America or from Nanotechnologies, Inc. These particles are surface-treated to improve dispersability in fluid. Typical particle size is 25 nm or less.

In the process of making the lubricating fluid with the nanoparticles, the mechanical process and sequence of adding the components are crucial in order to fully take advantage of the high viscosity index of the nanoparticles and to make the final fluid product with exceptionally high viscosity index. High impact mixing is necessary to achieve a homogeneous dispersion. A ball mill is one example of a high impact mixer. In the instant invention, an Eiger MINI MILL™ (Model: M250-VSE-EXP) is used as the high impact ball mill. It utilizes high wear resistant zirconia beads as the grinding media and circulates the dispersion constantly during milling. To achieve the best milling effect and therefore the best viscosity index improvement, the proper milling procedure has been developed. Firstly if the material is in bulk state, it must first be size reduced into powders (with average size less than 100 microns). Then a 5% to 20% by weight of powder form of the material, and more preferably 10% by weight of the powders, in base oil dispersion is milled into a paste state. Usually this step takes about 3 to 4 hours. Then add an appropriate amount of dispersing agent(s) into the mill, usually 1 to 2 times of the weight of carbon already in the mill. With the addition of dispersing agent(s) the paste changes from paste into liquid almost instantly, and extended milling becomes possible. For most cases the extended milling period is 4 hours. It should be pointed out that if the mixture in the mill turns into a paste, the recirculation of it becomes very difficult and thus a non-homogenous mixture is created. It is also found that if the dispersing agent(s) is(are) added into the mill at the very beginning, the viscosity index of the final nanofluids made from the milling process is not as high.

Fluid Preparation

Specific particle nanomaterials, compositions, methods, and embodiments discussed are intended to be only illustrative of the invention disclosed by this specification. Variation on these particle nanomaterials, compositions, methods, or embodiments are readily apparent to one skilled in the art based upon the teachings of this specification and are therefore intended to be included as part of the inventions disclosed herein.

The following example of the process is illustrated with lubricant formulations of automatic transmission fluids. However, the same process steps are used in preparing gear oils. Graphite particles were obtained by pulverizing big graphite chunks from The Carbide/Graphite Group, and subsequently passing the pulverized graphite through a 75 μm mesh filter, then 30 grams of the filtered graphite particles and 270 grams of BP Petrochemical DURASYN 162™ (a commercially available 2 centistokes polyalphaolefin, abbreviated hereafter as 2 cSt PAO) were added into the Eiger Mini MILL™ (Model: M250-VSE-EXP). The milling speed was gradually increased to 4000 rpm. After about 4 hours the above mixture turned into thick paste. Sixty (60) grams of the paste was removed and labeled "Paste A". Forty-eight (48) grams of a dispersant and inhibitor package (DI package), LUBRIZOL 9677MX™, was subsequently added into the mill and the remaining paste became fluid enough that successful recirculation was restored. The milling of the paste was stopped after an additional 4 hours and the paste was labeled "Paste B". Paste C was obtained by milling a mixture of 30 grams of graphite with diameter less than 75 μm, 60 grams of LUBRIZOL 9677MX™, and 270 grams of DURASYN 162™ at 4000 rpm for 8 hours. Note that the dispersing agent, LUBRIZOL 9677MX™, was added into the mill at the beginning of the milling process. Three automatic transmission fluids, A, B and C, were subsequently formulated using the aforementioned three pastes as a concentrate, and their final concentrations were the same: 2% graphite, 4% LUBRIZOL 9677MX™, 18% BP Petrochemical DURASYN 162™, 76% BP Petrochemical DURASYN 166™ (a commercially available 6 centistokes polyalphaolefin, abbreviated hereafter as 6 cSt PAO) (all percentages by weight). Example 1 illustrates the kinematic viscosity at 100° C. and the viscosity index (VI) of the fluids. It was also found that the graphite particle size before milling was critical to the viscosity modification effect of the graphite. For example, starting with graphite smaller than 10 (obtained as graphite powder from UCAR Carbon Company Inc.) and following the same procedure as Paste B, a thin Paste D was obtained. An automatic transmission fluid D was formulated with the same composition as automatic transmission fluid (ATF) A and result is list in Example 1 as well. The particle size was measured by atomic force microscopy (AFM). The graphite nanoparticles were found to be plate-like or disk-like in structure, with average diameter is around 50 nm and thickness around 5 nm (as we described earlier, nano-disks or nano-plates). The same principles and methods were followed in preparing gear oils, except that the ATF additive package was replaced with a fully formulated gear oil additive package, or combinations of individual gear oil additives. The final pastes were diluted to higher viscosity levels (compared with ATFs) typical of gear oils.

Example 1

Automatic Transmission Fluids and Viscosity Data

| | ATF | | | | |
|---|---|---|---|---|---|
| Parameter | A | B | C | D | E* |
| From Concentrate | Paste A | Paste B | Paste C | Paste D | N/A |
| Kinematic viscosity at 100° C., cSt | 7.55 | 19.68 | 10.83 | 7.48 | 7.15 |
| Kinematic viscosity at 40° C, cSt | 28.44 | 29.32 | 28.77 | 27.85 | 33.67 |
| Viscosity Index | 254 | 634 | 395 | 257 | 183 |

*E is a commercially available ATF which meets Mercon V.

Carbon nanotubes, double wall, multi-wall or single wall, of a controlled aspect ratio, are another preferred type of nanomaterial or particles. The nanotubes have a typical nanoscale diameter of 1-200 nanometers. More typically the diameter is around 10-30 nanometers. The length of the tube can be in submicron and micron scale, usually from 50 nanometers to 100 microns. More typical length is 500 nanometers to 50 microns. The aspect ratio of the tube (which is defined by the average length of the tubes divided by the average diameter) can be from hundreds to tens of thousands, more typical 100 to 2000. The surface of the nanotube can be treated chemically to achieve certain level of hydrophilicity, or left as is from the production.

The nanoplates and nanotubes can be mixed to obtain desired viscosity/shear and thermal conductivity behavior. Other high thermal conductivity carbon materials are also acceptable as long as they meet the thermal conductivity and size criteria set forth heretofore.

To confer long-term stability, an effective amount of one or more chemical dispersants or surfactants is preferred, although the special milling procedure in base oil described heretofore will also confer long term stability. The thermal conductivity enhancement, compared to the fluid without graphite, is proportional to the amount of nanomaterials added, their thermal conductivity, and their size and method of dispersion. The particle-containing fluid of the instant invention will have a thermal conductivity higher than the neat fluid, wherein the term eat is defined as the fluid before the particles are added.

The concentration, size and shape of the graphite nanoplates or nanotubes, along with the dispersant/surfactant type and concentration, are adjusted to provide the desired contribution to the overall fluid characteristics, e.g., viscosity and shear stability. As the particle concentration increases and the particle size decreases, the need for viscosity index improvers is decreased or completely eliminated, and the viscosity index is improved by the nanomaterials. The low aspect ratio nanoparticles, unlike conventional polymer viscosity index improvers, do not lose permanent viscosity due to shearing. In the instant invention levels of permanent shear stability of the fluid are achieved that can not be achieved with conventional polymer viscosity index improvers.

The present invention provides at a minimum, a gear lubricant containing less than 10% by weight graphite nanoparticles in the case of a grease, and less than 5% by weight graphite nanoparticles in the case of an oil.

Oil Basestocks

The nanoparticles are suspended in an oil basestock or petroleum liquid medium, according to the heretofore described process to form a concentrate. The nanoparticle concentrate is then diluted with additional oil basestock to the desired final nanoparticle concentration. The oil basestock or petroleum liquid medium will then comprise up to 98% of the final oil or grease. The basestock can be any petroleum distillates or synthetic petroleum oils, greases, gels, or oil-soluble polymer composition. More typically, it is the mineral basestocks or synthetic basestocks used in the lube industry, e.g., Group I (solvent refined mineral oils). Group II (hydrocracked mineral oils), Group III (severely hydrocracked oils, sometimes described as synthetic or semi-synthetic oils), Group IV (PAOs), and Group V (esters, naphthenes, and others). One preferred group includes the polyalphaolefins, synthetic esters, and polyalkylglycols.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-octenes), poly(1-decenes), etc., and mixtures thereof, alkylbenzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.), alkylated diphenyl, ethers and alkylated diphenyl sulfides and the derivatives, analogs and homologs thereof and the like. Alkylene oxide polymers and interpolymers and derivatives thereof where the terminal hydroxyl groups have been modified by esterification, etherification, etc. constitute another class of known synthetic oils.

Another suitable class of synthetic oils comprises the esters of dicarboxylic acids (e.g., phtalic acid, succinic acid, alkyl succinic acids and alkenyl succinic acids, maleic acid, azelaic acid, suberic acid, sebacic acid, fumaric acid, adipic acid, alkenyl malonic acids, etc.) with a variety of alcohols (e.g., butyl alcohol, hexyl alcohol, dodecyl alcohol, 2-ethylhexyl alcohol, ethylene glycol diethylene glycol monoether, propylene glycol, etc.). Specific examples of these esters include dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc. Other synthetic oils include liquid esters of phosphorus-containing acids (e.g., tricresyl phosphate, trioctyl phosphate, diethyl ester of decylphosphonic acid, etc.), polymeric tetrahydrofurans and the like.

Preferred polyalphaolefins (PAO) include those sold by Mobil Chemical Company as SHF™ fluids, and those sold by Ethyl Corporation under the name ETHYLFLO™ 162, 164, 166, 168, and 174, having varying viscosity from about 2 to about 460 centistokes, and ALBERMARLE™.

MOBIL SHF-42™ from Mobil Chemical Company, Emery 3004™ and 3006™, and Quantum Chemical Company provide additional polyalphaolefins basestocks. For instance, Emery 3004™ polyalphaolefin has a viscosity of 3.86 centistokes at 212° F. (100° C.) and 16.75 centistokes at 104° F. (40° C.). It has a viscosity index of 125 and a pour point of –98° F. and it also has a flash point of 432° F. and a fire point of 478° F. Moreover, Emery 3006 polyalphaolefin has a viscosity of 5.88 centistokes at 212° F. and 31.22 centistokes at 104° F. It has a viscosity index of 135 and a pour point of –87° F. It also has a flash point of 464° F. and a fire point of 514° F.

Additional satisfactory polyalphaolefins are those sold by Uniroyal Inc. under the brand SYNTON PAO-40™, which is a 40 centistokes polyalphaolefin. Also useful are the ORONITE™ brand polyalphaolefins manufactured by Chevron Chemical Company.

It is contemplated that Gulf SYNFLUD™ 4 centistokes PAO, commercially available from Gulf Oil Chemicals Company, a subsidiary of Chevron Corporation, which is similar in many respects to Emery 3004™ may also be utilized herein. MOBIL SHF-41™ PAO, commercially available from Mobil Chemical Corporation, is also similar in many respects to Emery 3004™.

Preferably the polyalphaolefins will have a viscosity in the range of about 2-100 centistokes at 100° C., with viscosity of 4 and 10 centistokes being particularly preferred.

The most preferred synthetic base oil ester additives are polyolesters and diesters such as di-aliphatic diesters of alkyl carboxylic acids such as di-2-ethylhexylazelate, di-isodecyladipate, and di-tridecyladipate, commercially available under the brand name Emery 2960 by Emery Chemicals, described in U.S. Pat. No. 4,859,352 to Waynick. Other suitable polyolesters are manufactured by Mobil Oil. Mobil polyolester P-43™ and M-045™ containing two alcohols, and Hatco Corp. 2939™ are particularly preferred.

Diesters and other synthetic oils have been used as replacements of mineral oil in fluid lubricants. Diesters have outstanding extreme low temperature flow properties and good resistance to oxidative breakdown.

The diester oil may include an aliphatic diester of a dicarboxylic acid, or the diester oil can comprise a dialkyl aliphatic diester of an alkyl dicarboxylic acid, such as di-2-ethyl hexyl azelate, di-isodecyl azelate, di-tridecyl azelate, di-isodecyl adipate, di-tridecyl adipate. For instance, Di-2-ethylhexyl azelate is commercially available under the brand name of Emery 2958 by Emery Chemicals.

Also useful are polyol esters such as Emery 2935, 2936, and 2939 [tradenames] from Emery Group of Henkel Corporation and Hatco 2352, 2962, 2925, 2938, 2939, 2970, 3178, and 4322 [tradenames] polyol esters from Hatco Corporation, described in U.S. Pat. No. 5,344,579 to Ohtani et al., and Mobil ester P 24 from Mobil Chemical Company. Mobil esters such as made by reacting dicarboxylic acids, glycols, and either monobasic acids or monohydric alcohols like Emery 2936 synthetic-lubricant basestocks from Quantum Chemical Corporation and Mobil P 24™ from Mobil Chemical Company can be used. Polyol esters have good oxidation and hydrolytic stability. The polyol ester for use herein preferably has a pour point of about –100° C. or lower to –40° C. and a viscosity of about 2-460 centistokes at 100° C.

Group III oils are hydrogenated mineral oils preferred in the instant invention for providing superior performance to conventional lubricating oils with no other synthetic oil base or mineral oil base.

An hydrogenated oil is a mineral oil subjected to hydrogenation or hydrocracking under special conditions to remove undesirable chemical compositions and impurities resulting in a mineral oil based oil having synthetic oil components and properties. Typically the hydrogenated oil is defined as a Group III petroleum based stock with a sulfur level less than 0.03, severely hydro-treated and iso-dewaxed with saturates greater than or equal to 90 and a viscosity index of greater than or equal to 120, and may optionally be utilized in amounts up to 90 percent by volume, more preferably from 5.0 to 50 percent by volume and more preferably from 20 to 40 percent by volume when used in combination with a synthetic or mineral oil.

The hydrogenated oil may be used as the preferred base oil component of the instant invention providing superior performance to conventional motor oils with no other synthetic oil base or mineral oil base. When used in combination with another conventional synthetic oil such as those containing polyalphaolefins or esters, or when used in combination with a mineral oil, the hydrogenated oil may be present in an amount of up to 95 percent by volume, more preferably from about 10 to 80 percent by volume, more preferably from 20 to 60 percent by volume and most preferably from 10 to 30 percent by volume of the base oil composition.

A Group I or II mineral oil basestock may be incorporated in the present invention as a portion of the concentrate or a basestock to which the concentrate may be added. Preferred as mineral oil basestocks are Motiva Group II 100 Neutral or Marathon Ashland Petroleum (MAP) 325 Neutral defined as a solvent refined neutral having a Sabolt Universal viscosity of 325 SUS at 100° F. and MAP 100 Neutral defined as a solvent refined neutral having a Sabolt Universal viscosity of 100 SUS at 100° F., both manufactured by the Marathon Ashland Petroleum.

Other acceptable petroleum-base fluid compositions include white mineral, paraffinic and mid-VI naphthenic oils having the viscosity range of about 2-40 centistokes@100° C. Preferred white mineral oils include those available from Witco Corporation, Arco Chemical Company, PSI and Penreco. Preferred paraffinic oils include solvent neutral oils available from Exxon Chemical Company, HVI neutral oils available from Shell Chemical Company, and solvent treated neutral oils available from Arco Chemical Company. Preferred mid-VI naphthenic oils include solvent extracted coastal pale oils available from Exxon Chemical Company, mid-VI extracted/acid treated oils available from Shell Chemical Company, and naphthenic oils sold under the names HYDROCAL™ and CALSOL by Calumet, and described in U.S. Pat. No. 5,348,668 to Oldiges.

Finally, vegetable oils may also be utilizes as the liquid medium in the instant invention. Soybean or rapeseed oil, particularly of the high oleic or mid oleic genetically engineered type, commercially available from Archer Daniels Midland Company, are good examples of these oils. Soybean oil is of interest because it has a high thermal conductivity itself.

Dispersants

A. Dispersants used in the Lubricant Industry

Dispersants used in the lubricant industry are typically used to disperse the "cold sludge" formed in gasoline and diesel engines, which can be either "ashless dispersants", or containing metal atoms. They can be used in the instant invention since they are found to be an excellent dispersing agent for nanoparticles with graphitic structure of this invention. They are also needed to disperse wear debris and products of lubricant degradation within the moving parts of gear systems.

The ashless dispersants commonly used in the lubricant industry contain an lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 carbon atoms to ensure oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Of these ashless dispersants the ones typically used in the petroleum industry include N-substituted polyisobutenyl succinimides and succinates, alkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Preferred oil-based dispersants that are most important in the instant application include dispersants from the chemical classes of alkylsuccinimide, succinate esters, high molecular weight amines, Mannich base and phosphoric acid derivatives. Some specific examples are polyisobutenyl succinimide-polyethylencpolyamine, polyisobutenyl succinic ester, polyisobutenyl hydroxybenzyl-polyethylencpolyamine, bis-hydroxypropyl phosphorate. Commercial dispersants suitable for transmission fluid are for example, LUBRIZOL 890™ (an ashless PIB succinimide), LUBRIZOL 6420™ (a high molecular weight PIB succinimide), Ethyl Hitec 646™ (a non-boronated PIB succinimide). The dispersant may be combined with other additives used in the lubricant industry to form a "dispersant-detergent (DI)" additive package for a lubricant, e.g., LUBRIZOL 9001™ (used in gear oils), and the whole DI package can be used as dispersing agent for the nanoparticle dispersions.

B. Other Types of Dispersants

Alternatively a surfactant or a mixture of surfactants with low HLB (hydrophile-lipophile balance) value (typically less than or equal to 8), preferably nonionic, or a mixture of nonionics and ionics, may be used in the instant invention.

The dispersants selected should be soluble or dispersible in the liquid medium. The dispersant can be in a range of up from 0.01 to 30 percent, more preferably in a range of from between 0.5 percent to 25 percent, more preferably in a range of from between 1 to 20 percent, and most preferably in a range of from between 2 to 15 percent. The nanoparticle material can be of any desired weight percentage in a range of from 0.001 up to 50 percent. For practical application it is usually in a range of from between 0.01 percent to 25 percent, and most preferably in a range of from between 0.1 percent to 20 percent. The remainder of the formula is the selected medium and other desired additives.

It is believed that in the instant invention the dispersant functions by adsorbing onto the surface of the nanoparticle material.

Other Chemical Compounds

This dispersion may also contain a large amount of one or more other chemical compounds, preferably polymers, not for the purpose of dispersing, but to achieve additional thickening or other desired fluid characteristics. These can be added but reduce the amount of particulate that can be used without excessive thickening.

The viscosity improvers used in the lubricant industry can be used in the instant invention for the oil medium for the purpose of achieving additional thickening, which include olefin copolymers (OCP), polymethacrylates (PMA), hydrogenated styrene-diene (STD), and styrene-polyester (STPE) polymers. Olefin copolymers are rubber-like materials prepared from ethylene and propylene mixtures through vanadium-based Ziegler-Natta catalysis. Styrene-diene polymers are produced by anionic polymerization of styrene and butadiene or isoprene. Polymethacrylates are produced by free radical polymerization of alkyl methacrylates. Styrene-polyester polymers are prepared by first co-polymerizing styrene and maleic anhydride and then esterifying the intermediate using a mixture of alcohols.

Other compounds which can be used in the instant invention in the oil medium include: acrylic polymers such as polyacrylic acid and sodium polyacrylate, high-molecular-weight polymers of ethylene oxide such as POLYOX WSR™ from Union Carbide, cellulose compounds such as carboxymethylcellulose, polyvinyl alcohol (PVA), polyvinyl pyrrolidone (PVP), xanthan gums and guar gums, polysaccharides, alkanolamides, amine salts of polyamide such as Disparlon AQ series from King Industries, hydrophobically modified ethylene oxide urethane (e.g., ACRYSOL™ series from Rohmax), silicates, and fillers such as mica, silicas, cellulose, wood flour, clays (including organoclays) and nanoclays, and resin polymers such as polyvinyl butyral resins, polyurethane resins, acrylic resins and epoxy resins.

Chemical compounds such as seal swell agents or plasticizers can also be used in the instant invention and may be selected from the group including phthalate, adipates, sebacate esters, and more particularly: glyceryl tri(acetoxystearate), epoxidized soybean oil, epoxidized linseed oil, N,n-butyl benzene sulfonamide, aliphatic polyurethane, epoxidized soy oil, polyester glutarate, polyester glutarate, triethylene glycol caprate/caprylate, long chain alkyl ether, dialkyl diester glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12/PEG-65 lanolin oil, dialkyl adipate, alkylaryl phosphate, alkyl diaryl phosphate, modified triaryl phosphate, triaryl phosphate, butyl benzyl phthalate, octyl benzyl phthalate, alkyl benzyl phthalate, dibutoxy ethoxy ethyl adipate, 2-ethylhexyldiphenyl phosphate, dibutoxy ethoxy ethyl formyl, diisopropyl adipate, diisopropyl sebacate, isodecyl oleate, neopentyl glycol dicaprate, neopenty giycol diotanoate, isohexyl neopentanoate, ethoxylated lanolins, polyoxyethylene cholesterol, propoxylated (2 moles) lanolin alcohols, propoxylated lanoline alcohols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2,4-trimethyl-1,3-pentanediol monoisobutyrate, and diisononyl phthalate all of which are soluble in a solvent carrier. Other seal swelling agents such as LUBRIZOL 730 can also be used.

Antioxidants are an important part of transmission fluids. General classes include zinc dialkyldithiophosphates, alkyl and aryl phenols, alkyl and aryl amines, and sulfurized olefins. Commercial examples are Ciba L57™ (phenyl amine) and Etnyl HITEC 1656™.

Pour point depressants, either of polymethyl methacrylate or ethylene propylene olefin co-polymer type are useful to decrease pour point and/or the low temperature viscosity of the lubricating oil. Examples include ROHMAX 3008, ROHMAX 1-333, LUBRIZOL 6662A [tradenames].

Friction Modifiers are used to control friction and torque characteristics of the fluid. Commercial examples include LUBRIZOL 8650 and HITEC 3191 [tradenames].

The fluid can have other chemical agents or other type particles added to it as well to impart other desired properties, e.g., friction reducing agents, antiwear or anticorrosion agents, detergents, antioxidants, dispersants to define a lubricant composition suitable for use in vehicle applications or the like. Furthermore, the term fluid in the instant invention is broadly defined to include pastes, gels, greases, and liquid crystalline phases in either organic or aqueous media, emulsions and microemulsions. For instance, U.S. Pat. No. 4,029,587 by Koch teaches the use of a variety additives for functional fluids applicable to the present invention and is hereby incorporated by reference in its entirety. Moreover, U.S. Pat. No. 4,116,877 by Outten et al. teaches the use of a variety additives for hydraulic fluids such as automatic transmission fluids and power steering fluids applicable to the present invention and is hereby incorporated by reference in its entirety.

Physical Agitation

The physical mixing includes high shear mixing, such as with a high speed mixer, homogenizers, microfluidizers, a kady mill, a colloid mill, etc., high impact mixing, such as attritor, ball and pebble mill, etc., and ultrasonication methods or passing through a small orifice such as a fuel injector. Turbulent flows of any type will assist mixing.

Ball milling is the most preferred physical method in the instant invention since it is effective at rapidly reducing particles to very small size while simultaneously dispersing them into a concentrated paste as previously described. The concentrate can then be diluted with base oil and other additives to hit a final target viscosity, depending on the maximum temperature and shear conditions anticipated in the target vehicle application. For further size reduction and reducing particle maximum size the diluted oil can be passed through a small orifice such as a fuel injector. The raw material mixture may be pulverized by any suitable known dry or wet grinding method. One grinding method includes pulverizing the raw material mixture in the fluid mixture of the instant invention to obtain the concentrate, and the pulverized product may then be dispersed further in a liquid medium with the aid of the dispersants described above. However, pulverization or milling modifies the average aspect ratio of rod-like nanomaterials, e.g., carbon nanotubes. A detailed description has been given in an earlier section of the instant invention.

Ultrasonication is another physical method in the instant invention since it may be less destructive to the nanomaterial structure than the other methods described. Ultrasonication can be done either in the bath-type ultrasonicator, or by the horn-type ultrasonicator (or called the "wand"). More typically, horn-type ultrasonication is applied for higher energy output. Sonication at the medium-high instrumental intensity for up to 30 minutes, and usually in a range of from 10 to 20 minutes is desired to achieve better homogeneity.

The instant method of forming a stable dispersion of nanomaterials in a solution consist of three steps. First select the appropriate concentrate of dispersant or mixture of dispersing and other additives for the nanomaterial, and the oily medium, and dissolve the dispersant into the liquid medium to form a concentrate solution (keeping in mind the final additive concentrations desired following dilution); secondly add a high concentration of the nanomaterials, e.g., graphite nanoparticles or carbon nanotubes, into the dispersant-containing solution, initiate strong agitation: ball milling, or ultrasonicating, or any combination of physical methods named; following an agitation time of several hours, the resulting paste will be extremely stable and easily dilutable into more base oils and additives to give the final desired concentrations of additives and the desired final viscosity.

An important aspect of this invention is that the final gear oil should be prepared to give an acceptable lubricant film thickness at the maximum shear rate and temperature of use in the target axle or gear system. The maximum concentration of particles in the final (diluted) gear oil is limited by the relationship between viscosity increase of the fluid caused by the particles, and the temporary loss of viscosity (associated with the particles) at maximum temperature and shear rate of fluid use. In general, the heat transfer improvement with the gear oil of the instant invention will be greater at room temperature than at the highest temperature of use due to the excellent viscosity index of the particle-containing fluids, depending on the particle size and their thickening effect. Viscosity index is defined as the relationship of viscosity to the temperature of a fluid. It is determined by measuring the kinematic viscosities of the oil at 40 and 100° C. and using the tables or formulas included in ASTM D2270. It is important to note that the smaller particles give the best thermal conductivity increase, and higher viscosity index of fluid, but may also contribute to temporary viscosity loss in shear fields. Although temporary (reversible) shear loss is a good way to obtain fuel efficiency, it is preferred to balance the size and shape distribution of the particles to maintain viscosity under conditions where low lubricant film thickness occurs while getting maximum shear thinning under conditions where full fluid films protect the gear durability. As an example, a fluid made with heat transfer improvement of 20% at 100° C. may have an improvement of 60% or more when compared to a conventional fluid at 40° C. Therefore the heat transfer improvement due to the particles may be twofold, due to the higher thermal conductivity of the particles, and also due to the exceptional viscosity index of the particle-containing fluid.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 6 is a graph showing a comparative reduction in traction with nanofluid gear oil.

FIG. 7 is a graph showing reduced boundary friction of the present invention at slow sliding speeds.

DETAILED DESCRIPTION OF THE PREFERRED EMBODIMENT

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated. Reference to documents made in the specification is intended to result in such patents or literature cited are expressly incorporated herein by reference, including any patents or other literature references cited within such documents as if fully set forth in this specification.

Figure 1:
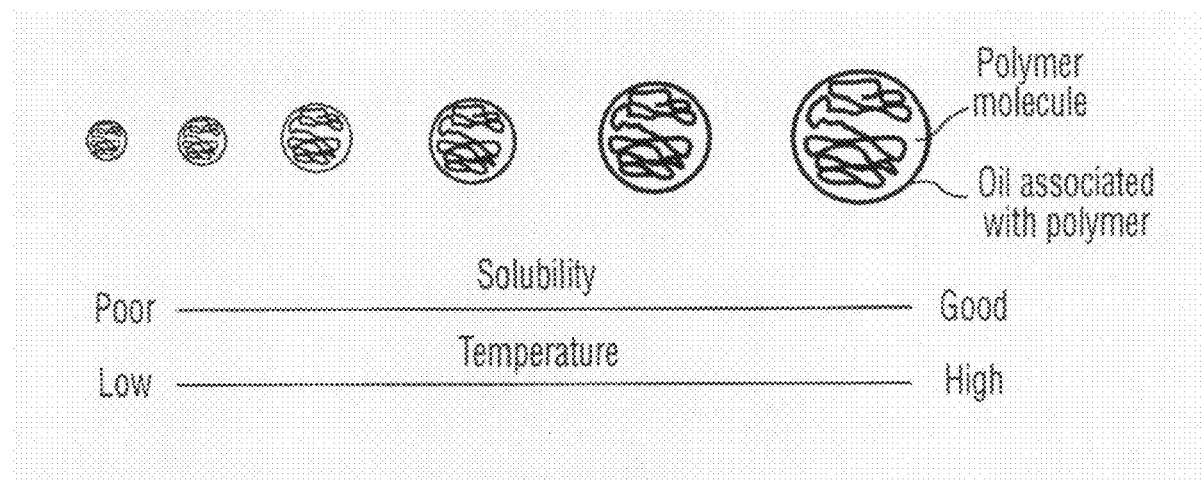
FIG. 1 is a schematic drawing of the working mechanism of a polymer-based viscosity modifier.
Figure 2:
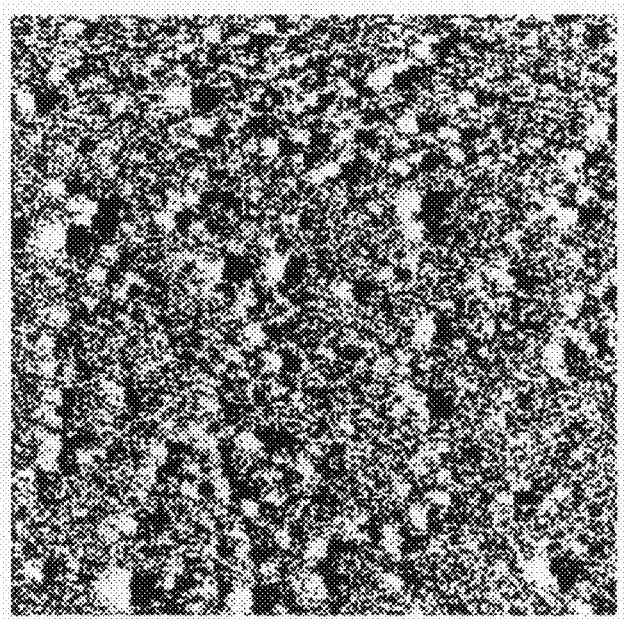
FIG. 2 is an atomic force microscopy (AFM) picture of a lubricant composition showing the graphite nanoparticles as plate-like structures with an average diameter of around 50 nm and thickness around 5 nm.
Figure 3:
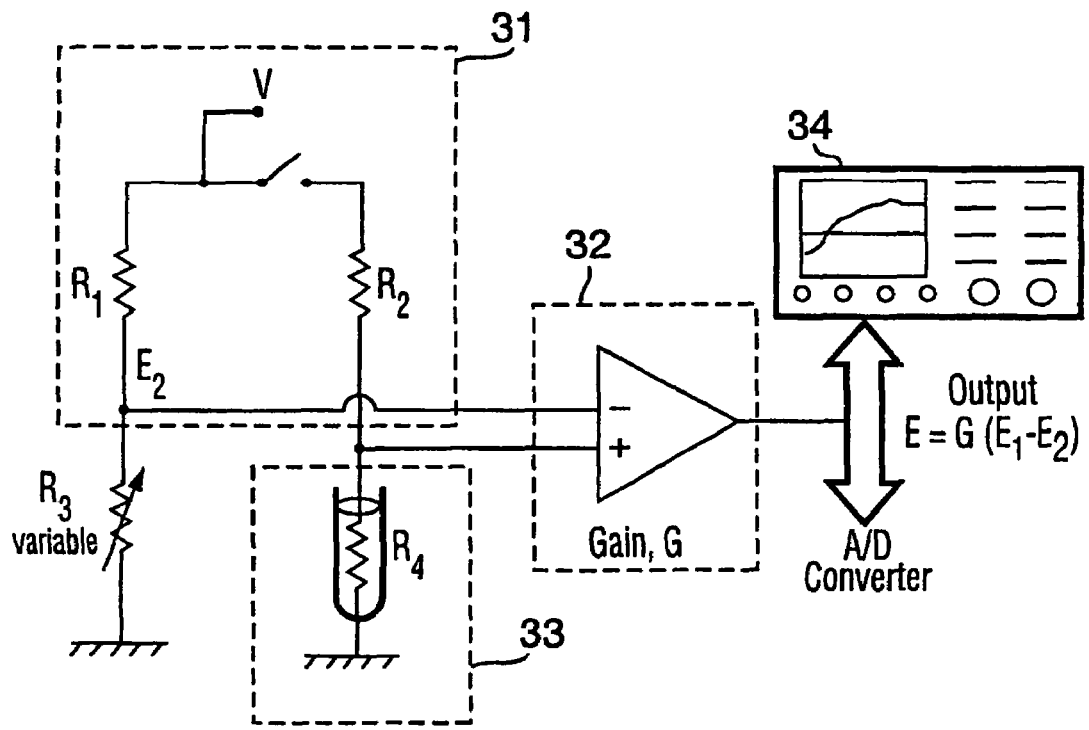
FIG. 3 is a diagram of a hot-wire rig constructed in-house to obtain the absolute measurement of the thermal conductivity of electrically non-conducting liquids by the transient hot-wire method.

FIG. 3 depicts a hot-wire rig constructed by the inventors. Thermal conductivity is measured by a transient hot-wire rig constructed in-house according to Nagasaka et al. (Y. Nagasaka and A. Nagashima, Absolute measurement of the thermal conductivity of electrically conducting liquids by the transient hot-wire method, *Journal of Physics E: Sci. Instrum.* 1981, 14, 1435-1440). The unit utilizes a DC power supply 31, a differential amplifier 32, a sample chamber with a hot-wire 33, and an oscilloscope 34 for measurement.

Figure 4:
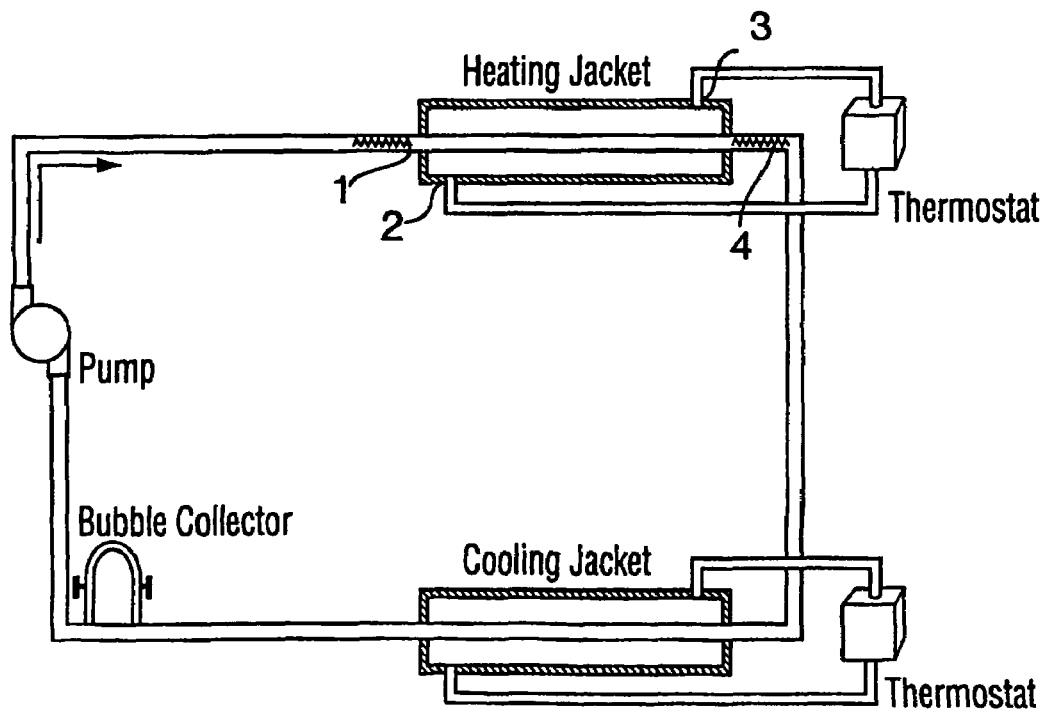
FIG. 4 is a diagram of a low Reynold's number circulating rig constructed in-house to measure heat transfer coefficient.

The heat transfer coefficient of a test fluid is evaluated through a low Reynold's number circulating rig constructed in-house, the diagram of which is illustrated in FIG. 4.

Gear Lubricant Temperature Study

A gear oil formulation based on the instant invention is tested in a chassis dynamometer for gear box temperature advantage against a conventional synthetic 75W-90.

Example 2

Comparison of Typical Formulations of Synthetic Gear Oils Formulated with and without Carbon Nano-Plates

| Component | Conventional Synthetic Gear Oil | Gear Oil containing Nano-plates |
|---|---|---|
| YUBASE 100 N ™ | 47.70 | 0.00 |
| DURASYN 164 ™ | 15.00 | 9.00 |
| DURASYN 166 ™ | 0.00 | 67.00 |
| LUBRIZOL Gear Oil Additive Package | 10.00 | 10.00 |
| LUBRIZOL 3174 ™ | 26.30 | 12.00 |
| VISCOPLEX 0-112 ™ | 1.00 | 1.00 |
| Graphite nanoplate | 0.00 | 1.00 |
| Process | Graphite was obtained as powders from UCAR, and milled in 4 cSt PAO/additive package to obtain a concentrate before the other ingredients were added to make the final formulation. | |
| Thermal Conductivity | 0.1399 | 0.1712 |
| Viscosity at 100° C. | 14.21 | 14.79 |
| Viscosity at 40° C. | 98.63 | 65.06 |
| Viscosity Index | 148 | 240 |

Figure 5:
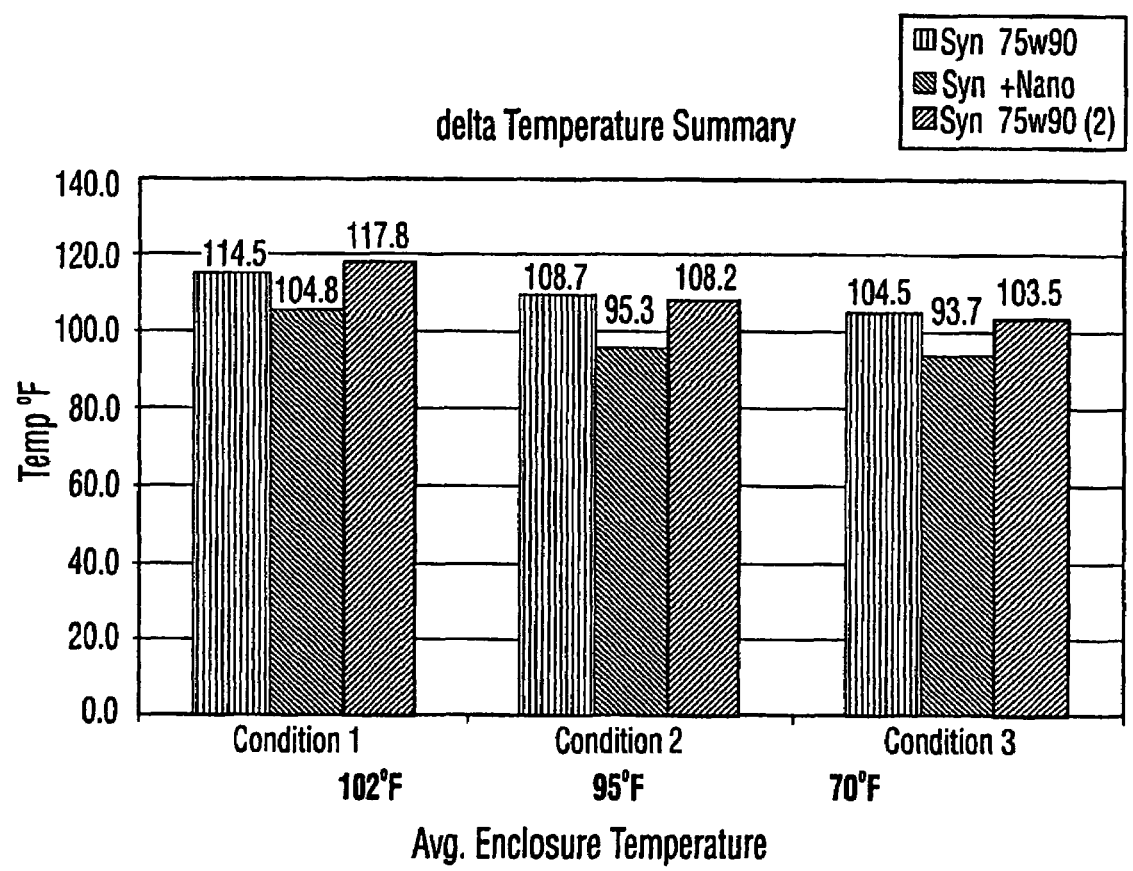
FIG. 5 is a graph showing the reduction in gear box temperatures achieved with nanofluid gear oil.

FIG. 5 shows the lower gear box temperature of the gear oil of the instant invention. The direct benefits of this temperature reduction include longer device life, longer fluid service life and better fuel economy.

Example 3

Tribological Study of the Gear Oil of the Instant Invention

| Code | GO | NF-1 | NF-2 | BF-1 | BF-2 |
|---|---|---|---|---|---|
| Product description | Conventional 75W-90 | Gear oil using graphite nanoplate | Gear oil using $Al_2O_3$ nanoparticles | Base fluid of the gear oils of the instant invention | Base fluid of the gear oils of the instant invention without any viscosity modifiers |
| Mass % nanomaterial | 0 | 1.5 | 2.0 | 0 | 0 |
| Nanomaterial | None | carbon nanoplate | $Al_2O_3$ | None | None |
| Vis 100° C. | 14.00 | 14.24 | 10.02 | 9.30 | 5.65 |
| Vis at 40° C. | 96.04 | 72.6 | 60.76 | 56.02 | 28.23 |
| Viscosity Index | 149 | 205 | 151 | 148 | 145 |
| k(w/m · K) | 0.1399 | 0.1712 | 0.1586 | 0.1478 | 0.1465 |

FIG. 6 shows the traction curves of the above fluids. Reduced traction coefficient in an SAE 75W-90 gear oil is observed when graphite nano-plates or aluminum oxide nanoparticles are used to partially replace the polymeric viscosity index improvers. As can been seen, the gear oils of the instant invention exhibit lower traction coefficients compared with the conventional synthetic 75W-90 gear oil, which indicates that the fluid formulation of the instant invention is more fuel efficient than its conventional analogues, besides providing an obvious boost in thermal conductivity.

FIG. 7 shows the Stribeck curve of the aforementioned five fluids formulated and tested. A Stribeck curve is a common tool of examining the boundary friction of the lubricants with the metal parts moving in relatively low speed condition. It can be seen that lower boundary friction at slow sliding speeds is achieved by the gear oil of instant invention using graphite nanoplates as nanomaterial, indicting that the fluid formulation of the instant invention reduces friction better than its conventional analogues.

To demonstrate that there is no permanent shear loss to these nanoplate-containing fluids, a standard European gear lubricant test, CEC L-45-T-93, was run on a conventional synthetic gear oil, a SYNPOWER™ 75W-90, and on a gear oil formulated according to the instant invention using graphite nanoplates. This test is designed to permanently shear down the non-shear-stable polymers in the formulation through a special taper roller bearing rig.

Example 4

Permanent shear test data on a SYNPOWER™ 75W-90 and a nanofluid gear oil. It can be seen that the gear oil of the instant invention is more shear stable than the conventional synthetic gear oil.

| | SYNPOWER ™ 75W-90 | Nano-plate Gear Oil |
|---|---|---|
| Graphite nano-plates | 0 | 1% |
| 100° C. Kinematic Viscosity before shear | 14.90 cSt | 18.14 cSt |

-continued

|  | SYNPOWER ™ 75W-90 | Nano-plate Gear Oil |
|---|---|---|
| 100° C. Kinematic Viscosity after shear | 13.96 cSt | 17.47 cSt |
| Percent Viscosity Loss due to shear | 6.31 | 3.69 |

A gear oil formulation containing nanomaterial is based on a concentrate of 10% graphite (UCAR GS-4E), 10% LZ OS#134664X and 80% PAO2 as set forth in Example 5 which depicts high-temperature shear stable dispersion using a dispersant viscosity improver:

| Component | Percent by Weight |
|---|---|
| PA02 | 12.0 |
| YUBASE 4 | 10.0 |
| PAO4 | 10.0 |
| YUBASE 6 | 35.5 |
| LZ9001N | 10.0 |
| LZ3174 | 14.5 |
| R O 112 | 1.0 |
| NANO-GRAPHITE | 1.5 |
| LZ OS# 134664X | 1.5 |
| ETHYL 5777 | 4.0 |
| vis@100° C. | 14.52 |
| Vis@40° C. | 89.85 |
| VI | 168 |
| k(W/mK) | 0.1708 |

Figure 8:
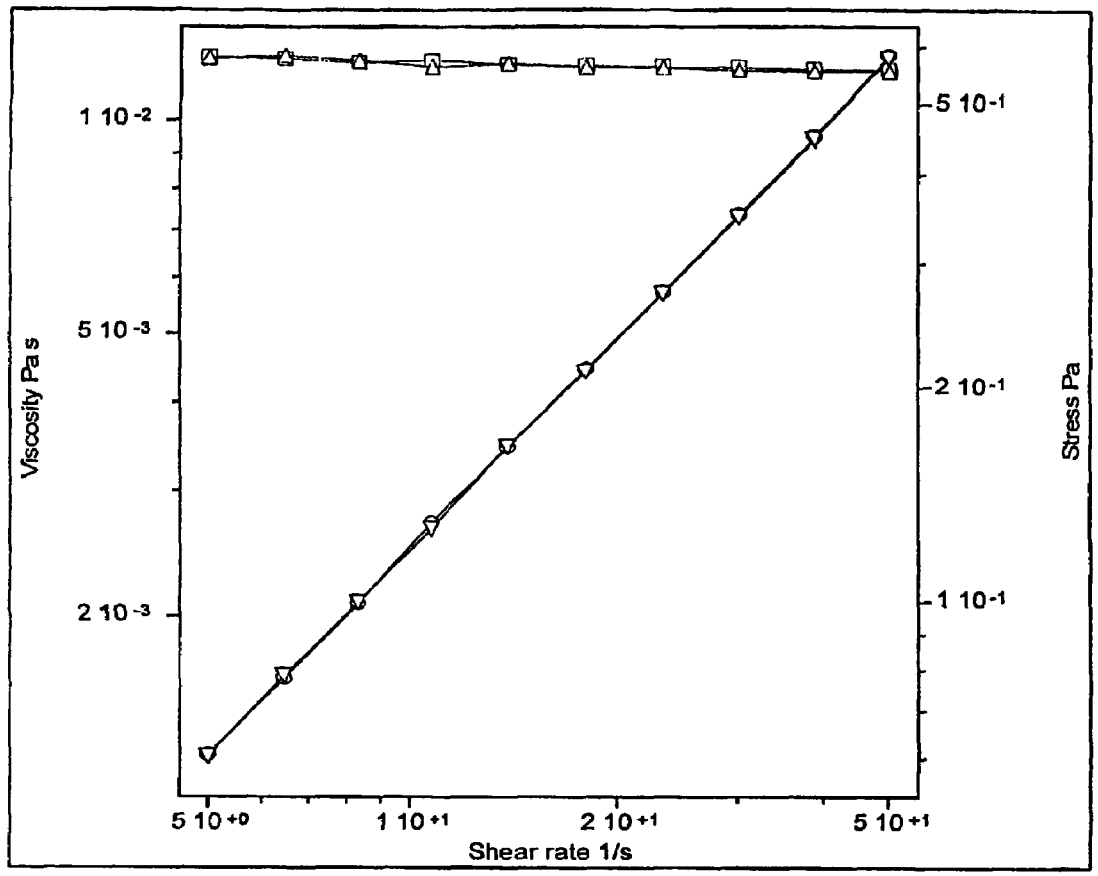
FIG. 8 is a graph showing viscosity versus shear rate for formula and rheology for a gear oil formula with nano material showing a high temperature shear stable dispersion.

FIG. 8 shows test results for the fully formulated gear oil with nano graphite as set forth in Example 5 using an ATS Viscoanalyser Rheometer at the University of Kentucky. A plot of viscosity versus shear rate is generated. The rheology testing wa run twice at 100° C. The more stable the dispersion, the slope of the viscosity line will approach zero and the data from both runs will be identical. Both the formula and rheology plot is shown in FIG. 8. By using a dispersant viscosity improver ETHYL 5777 a high temperature shear stable dispersion was obtained from a concentrate of 10% graphite (UCAR GS-4E), 10# LZ OS # 134664X, and 80% of PAO2.

The foregoing detailed description is given primarily for clearness of understanding and no unnecessary limitations are to be understood therefrom, for modification will become obvious to those skilled in the art upon reading this disclosure arid may be made upon departing from the spirit of the invention and scope of the appended claims. Accordingly, this invention is not intended to be limited by the specific exemplification presented herein above. Rather, what is intended to be covered is within the spirit and scope of the appended claims.

What is claimed is:

1. A fluid composition comprising base oil, an oil soluble additive containing nanomaterials selected from the group consisting of carbon nanoplates formed by wet milling of bulk graphitic material, carbon nanotubes having a length of 50 nanometers to 100 microns, and mixtures thereof.

2. The fluid of claim 1, wherein said nanomaterials comprise 5 to 20% of the total mass of said fluid.

3. The fluid of claim 1, wherein said base oil is selected from the group consisting of mineral base oils, synthetic base oils, and base oils derived from biological materials.

4. The fluid of claim 1, wherein said at least one dispersant is a mixture of non-ionic and ionic surfactants.

5. The fluid of claim 4, wherein said at least one surfactant comprises surfactants with HLB values less than 8.

6. The fluid of claim 1, wherein said at least one dispersant is an ashless polymeric surfactant.

7. The fluid of claim 1, wherein said nanomaterials comprise carbon nanomaterials utilized as a means for improving the viscosity index of a fluid.

8. The fluid of claim 1, wherein said nanomaterials comprise carbon nanomaterials utilized as a means for controlling shear stability.

9. The fluid of claim 8, wherein said shear stability is constant throughout the useful life of the fluid.

10. The fluid of claim 1, wherein said fluid composition is a lubricant.

11. The lubricant of claim 10, wherein said lubricant selected from the group consisting of gear oil, transmission oil, engine oil, and hydraulic oil.

12. The fluid of claim 1, wherein said carbon nanotubes have a mean diameter between 1 and 200 microns.

13. The fluid of claim 1, wherein said carbon nanotubes have a ratio of length to diameter of 100 to 2000.

14. The fluid of claim 1, wherein said carbon nanotubes and nanoplates are made from graphite having a thermal conductivity of at least 80 W/m·K.

15. A method of creating a carbon nanomaterials concentrate comprising;
   a. the step of selecting bulk graphitic materials with thermal conductivity greater than 80 W/m·k;
   b. the step of pulverizing said bulk graphitic materials;
   c. the step of adding the pulverized graphite into a mixture of a suitable base oil and at least one dispersant having a low hydrophile-lipophile balance (HLB) value of 8 or less;
   d. the step of preshear mixing said pulverized graphite and said base oil and said at least one dispersant by utilizing a wet milling mixing means to form a pasty liquid concentrate having a stable viscosity containing at least some graphitic nanoparticles; and
   e. the step of adding an additional dispersant and re-mixing by milling forming a concentrate containing graphitic nanoparticles having a mean size of less than 500 nanometers in diameter, selected from the group consisting of carbon nanoplates formed by wet milling of bulk graphitic material, carbon nanotubes having a length of 50 nanometers to 100 microns, and mixtures thereof.

16. The fluid composition of claim 1 further comprising carbon nanoplates, and at least one dispersant in an amount sufficient to disperse and suspend said carbon nanoplates in said base oil.

17. The fluid of claim 16, further comprising carbon nanotubes.

18. The fluid of claim 16, wherein said base oil is selected from the group consisting of mineral base oils, synthetic base oils, and base oils derived from biological materials.

19. The fluid of claim 16, wherein said at least one dispersant is a mixture of non-ionic and ionic surfactants.

20. The fluid of claim 18, wherein said at least one surfactant comprises surfactants with HLB values less than 8.

21. The fluid of claim 16, wherein said at least one dispersant is an ashless polymeric surfactant.

22. The fluid of claim 16, wherein said carbon nanoplates and nanotubes improve the viscosity index of a fluid.

23. The fluid of claim 16, wherein said carbon nanoplates and nanotube control shear stability.

24. The fluid of claim 22, wherein said shear stability is constant throughout the useful life of the fluid.

25. The fluid of claim 23, wherein said fluid composition is a lubricant.

26. The lubricant of claim 24, wherein said lubricant is selected from the group consisting of a gear oil, a transmission oil, an engine oil, and a hydraulic oil.

27. The method of claim 15 including the step of optimizing the thermal conductivity of a fluid by controllably modifying the ratio of carbon nanotubes to carbon nanoplates in the fluid.

28. The method of claim 27, further comprising the step of adding additional dispersants to said concentrate mid-way through the high impact mixing period.

29. The method of claim 27, further comprising the step of surface treating said nanomaterials to improve the solubility of said nanomaterials in said fluid.

30. The method of claim 27, wherein said concentrate is pre-sheared to the extent that said nanomaterials have a mean diameter of less than 500 nanometers.

31. The method of claim 27, wherein said nanomaterials are surface treated to improve solubilization in said fluid.

32. The method of claim 27, wherein said additional dispersant is added in a quantity of between 1 and 2 times the mass of the carbon nanomaterials present in said concentrate.

33. The method of claim 32, said mixing means comprising a high impact milling means.

34. The method of claim 32, said mixing means comprising ultrasonication.

35. The method of claim 32, further comprising the step of passing said concentrate through a filter with a predetermined mesh size.

36. The method of claim 35, wherein said mesh size is no larger than 75 microns.

37. The method of claim 27 including the step of using carbon nanomaterials to reduce the traction coefficient of a lubricant.

38. The method of claim 27 including the step of using carbon nanomaterials to increase the viscosity index of a lubricant.

39. The method of claim 27 including the step of optimizing the shear stability of a fluid by controllably modifying the ratio of carbon nanotubes to carbon nanoplates in the fluid.

40. The method of claim 27 including the step of optimizing the traction coefficient of a fluid by the selective addition of carbon nanomaterials.

41. The method of claim 40, wherein said carbon nanomaterials replace viscosity index improvers in a lubricant.

* * * * *

UNITED STATES PATENT AND TRADEMARK OFFICE
CERTIFICATE OF CORRECTION

| | |
|---|---|
| PATENT NO. | : 7,449,432 B2 |
| APPLICATION NO. | : 11/370118 |
| DATED | : November 11, 2008 |
| INVENTOR(S) | : Frances E. Lockwood et al. |

It is certified that error appears in the above-identified patent and that said Letters Patent is hereby corrected as shown below:

Title Page, Item (74) Attorney, Agent, or Firm - should read --Wood, Herron & Evans, L.L.P.--.
In the Specification
Col. 1, line 8, "form" should read --from--.
Col. 8, line 23, "properties of the oil is" should read --properties of the oil are--.
Col. 8, line 48, "than 80W/m-K" should read --than 80W/m-K.--.
Col. 11, line 15, "with average diameter is around" should read --with average diameter around--.
Col. 11, line 66, "wherein the term eat" should read --wherein the term neat--.
Col. 15, line 2, "contain an lipophilic" should read --contain a lipophilic--.
Col. 15, line 40, "can be in a range of up" should read --can be in a range of--.
Col. 16, line 38, "neopenty giycol diotanoate," should read --neopentyl glycol dioctanoate,--.
Col. 17, line 2, "use of a variety additives" should read --use of a variety of additives--.
Col. 17, line 6, "additives for hydraulic fluids" should read --of additives for hydraulic fluids--.
Col. 17, line 43, "a solution consist of" should read --a solution consists of--.
Col. 18, line 64, "literature cited are" should read --literature cited being--.
Col. 20, line 29, "As can been seen," should read --As can be seen,--.
Col. 21, line 36, "testing wa" should read --testing was--.
Col. 21, line 48, "arid may be made" should read --and may be made--.
Col. 22, line 15, "wherein said lubricant" should read --wherein said lubricant is--.
Col. 22, line 26, "comprising;" should read --comprising:--.
Col. 22, line 65, "nanotube" should read --nanotubes--.
Col. 23, line 11, "27" should read --15--.
Col. 23, line 14, "27" should read --15--.
Col. 23, line 17, "27" should read --15--.
Col. 23, line 20, "27" should read --15--.
Col. 23, line 22, "27" should read --15--.
Col. 24, line 10, "27" should read --15--.
Col. 24, line 13, "27" should read --15--.
Col. 24, line 16, "27" should read --15--.
Col. 24, line 19, "27" should read --15--.

Signed and Sealed this
Thirty-first Day of May, 2016

Michelle K. Lee
*Director of the United States Patent and Trademark Office*